United States Patent
Suzuki

(10) Patent No.: US 7,078,828 B2
(45) Date of Patent: Jul. 18, 2006

(54) KEYLESS ENGINE CONTROLLING UNIT

(76) Inventor: Chizuko Suzuki, 16417-1, Irino-cho, Hamamatsu-shi, Shizuoka-ken (JP)

(*) Notice: Subject to any disclaimer, the term of this patent is extended or adjusted under 35 U.S.C. 154(b) by 444 days.

(21) Appl. No.: 10/348,922

(22) Filed: Jan. 22, 2003

(65) Prior Publication Data
US 2003/0137195 A1    Jul. 24, 2003

(30) Foreign Application Priority Data
Jan. 24, 2002   (JP) ............................. 2002-016096

(51) Int. Cl.
*B60R 25/04*   (2006.01)

(52) U.S. Cl. ..................... 307/10.3; 180/287
(58) Field of Classification Search ............... 340/539, 340/825.69, 825.72; 307/9.1, 10.6, 10.3; 180/287
See application file for complete search history.

(56) References Cited

U.S. PATENT DOCUMENTS

| | | | | |
|---|---|---|---|---|
| 4,403,675 A | * | 9/1983 | Cardwell | 180/287 |
| 5,670,831 A | * | 9/1997 | Georgiades | 307/10.3 |
| 5,673,017 A | * | 9/1997 | Dery et al. | 340/426.17 |

FOREIGN PATENT DOCUMENTS

| | | |
|---|---|---|
| JP | 1-287385 | 11/1989 |
| JP | 10-053109 | 2/1998 |
| JP | 2000-71940 | 3/2000 |
| JP | 2002-201841 | 7/2002 |

* cited by examiner

Primary Examiner—Brian Sircus
Assistant Examiner—Luis E. Ramán
(74) Attorney, Agent, or Firm—Harness, Dickey & Pierce P.L.C.

(57) ABSTRACT

A keyless engine controlling unit has a set switch for setting an engine in a running state, a selected state detecting mechanism for detecting the position of a select lever of an automatic transmission, and an engine drive controlling mechanism for bypassing a contact point of an ignition switch. During engine operation, the selected state detecting mechanism detects that the select lever is in park, the set switch is set, and the contact point of the ignition switch is bypassed. Thus, the engine is maintained in the running state even if the key is extracted from the ignition switch.

12 Claims, 8 Drawing Sheets

KEYLESS ENGINE CONTROLLING UNIT

CROSS-REFERENCE TO RELATED APPLICATIONS

This application claims priority to Japanese Patent Application No. 2002-016096 filed Jan. 24, 2002, which application is herein expressly incorporated by reference.

FIELD OF THE INVENTION

The present invention relates to a keyless engine controlling unit in an automotive vehicle, where the engine is maintained in a running state or can be started even if the key is extracted from the ignition switch.

BACKGROUND OF THE INVENTION

In the prior art, if a driver leaves the engine running in the automotive vehicle for a long time, the doors may be locked by using a spare key different from the key inserted into the ignition switch or by using a transmitter of a keyless entry system in order to prevent the automotive vehicle from being stolen or the like. The engine may be left on to keep the air conditioner in operation to maintain the temperature inside of the automotive vehicle or to warm up the engine by an idling operation to obtain stable running characteristics from a starting time.

However, since the spare key, which is different from the key or the transmitter of a keyless entry system, is necessary, it is troublesome to manage the keys.

Also, if window glass is broken to unlock the automotive vehicle, since the key is left in the ignition switch, the automotive vehicle is easily stolen by the usual drive operation.

In view of the foregoing circumstances, it is an object of the present invention to provide a keyless engine controlling unit where a driver can leave the automotive vehicle by locking an opening/closing means such as a door by using a key. The key is not left in the automotive vehicle. This prevents the vehicle from being stolen and also easily supervises the key without a special spare key.

SUMMARY OF THE INVENTION

It is an object of the present invention to provide a keyless engine controlling unit where a driver can remove the key from the ignition, leave the automotive vehicle running after locking an opening/closing means such as a door with the key. The key is not left in the automotive vehicle. This prevents the vehicle from being stolen and also easily supervises the key without a special spare key.

The keyless engine controlling unit includes a set switch for setting an engine in a running state, a selected state detecting mechanism for detecting the position of a select lever of an automatic transmission, and an engine drive controlling mechanism for bypassing a contact point of an ignition switch. During engine operation, the selected state detecting mechanism detects that the select lever is in a park position, the set switch is set, and the contact point of the ignition switch is bypassed. Thus, the engine is maintained in a running state even if the key is extracted from the ignition switch.

The keyless engine controlling unit comprises a set switch for setting an engine running state. A selected state detecting mechanism detects a select lever position of an automatic transmission. An engine drive controlling mechanism bypasses a contact point of an ignition switch. Thus, when the engine is in a running state, the selected state detecting mechanism detects that the select lever is in a park position, the set switch is set, and the contact point of the ignition switch is bypassed. Thus, the engine is maintained in a running state even when the key is extracted from the ignition switch.

The keyless engine controlling unit comprises a locked state detecting mechanism to detect a state of a door lock switch to operate a door lock. A selected state detecting mechanism detects a select lever state of an automatic transmission. An engine drive controlling mechanism bypasses a contact point of an ignition switch. Thus, when the engine is in a running state, the selected state detecting mechanism detects that a select lever is in its park position, the door lock switch of a door on a driver's seat side is turned on and off by a predetermined number of operations, and the contact point of the ignition switch is bypassed. Thus, the engine is maintained in a running state even when the key is extracted from the ignition switch.

The keyless engine controlling unit comprises a locked state detecting mechanism to detect a state of a door lock switch to operate a door lock. A selected state detecting mechanism detects a select lever state of an automatic transmission. An engine drive controlling mechanism bypasses a contact point of an ignition switch. Thus, when the engine is in a running state, the selected state detecting mechanism detects that a select lever is in a park position, the door lock switch is turned on while a door on a driver's seat side is opened and the door is then closed, and the contact point of the ignition switch is bypassed. Thus, the engine is maintained in a running state of the engine even when a key is extracted from the ignition switch.

The keyless engine controlling unit has an opening/closing mechanism that is unlocked when the engine drive controlling mechanism is shifted to a state to maintain a running state of the engine.

The keyless engine controlling unit further comprises a stolen state detecting mechanism to detect if the automotive vehicle is in a stolen state by detecting if the opened/closed state of an opening/closing mechanism. Also, a burglarproof mechanism is included. An alarm goes off when the stolen state detecting mechanism detects that the automotive vehicle is in a stolen state. Thus, when the engine is in a running state and the key has been extracted from the ignition switch, a door lock mechanism is operated by using the key so that the opening/closing mechanism is locked and the burglarproof mechanism is set in an alert state.

The keyless engine controlling unit further comprises a keyless entry unit with a transmitter for transmitting a predetermined peculiar signal. A receiver is provided in the automotive vehicle to receive the peculiar signal from the transmitter to lock and unlock the opening/closing mechanism without a key. The burglarproof mechanism has a stolen state detecting mechanism to detect the automotive vehicle in a stolen state by detecting an opened/closed state of the opening/closing mechanism. An alarm activates when the stolen state detecting mechanism detects that the automotive vehicle is in a stolen state. Thus, when the engine is running when the key has been extracted from the ignition switch, the keyless entry unit is used, so that the opening/closing mechanism is locked and the burglarproof mechanism is set in an alert state.

The keyless engine controlling unit has an engine drive controlling mechanism that opens a contact point of the ignition switch to stop the engine when the engine is running when the key is inserted into the ignition switch and the key has been extracted from the ignition switch.

The keyless engine controlling unit has an engine drive controlling mechanism that opens a contact point of the ignition switch to stop the engine when an opening/closing means is unlocked by operating a door lock when the engine is running and the key has been extracted from the ignition switch.

The keyless engine controlling unit wherein, when the engine is running and a key has been extracted from the ignition switch, and when an opening/closing mechanism is unlocked by using a keyless entry unit, an engine drive controlling mechanism opens a contact point of the ignition switch to stop the engine.

The keyless engine controlling unit wherein when the engine is running and a key has extracted from the ignition switch, and when an opening/closing mechanism is unlocked by using a keyless entry unit, an alert state of a burglarproof mechanism is cancelled.

The keyless engine controlling unit wherein when the engine is running and a key has been extracted from the ignition switch, and when a stolen state detecting mechanism detects that the automotive vehicle is in a stolen state, an engine drive controlling mechanism opens a contact point of the ignition switch to stop the engine.

The keyless engine controlling unit wherein when the engine is running and the key has been extracted from the ignition switch, and when a selected state detecting mechanism detects that the select lever is shifted to a position other than park, an engine drive controlling mechanism opens a contact point of the ignition switch to stop the engine.

The keyless engine controlling unit, wherein when the engine is running and even when the key is extracted from the ignition switch, only when the key is inserted into the ignition switch and turned on, a select lever can be operated.

The keyless engine controlling unit further comprising a selected state detecting mechanism to detect a select lever state of an automatic transmission and an engine drive controlling mechanism to bypass a contact point of an ignition switch. When the selected state detecting mechanism detects that a select lever is positioned in park, a receiver receives a signal for locking an opening/closing mechanism under a locked state of the opening/closing mechanism, the contact point of the ignition switch is bypassed to operate a starter motor, so that an engine is started.

The keyless engine controlling unit wherein under a locked state of an opening/closing mechanism, and when a receiver receives a signal for unlocking the opening/closing mechanism and then receives a signal for locking the opening/closing mechanism within a predetermined time, a contact point of an ignition switch is bypassed to operate a starter motor, so that an engine is started.

The keyless engine controlling unit further comprises an informing mechanism for informing that the engine is being driven after verifying a drive state of the engine.

The keyless engine controlling unit wherein when the engine is running and a receiver of a keyless entry unit receives a signal for locking an opening/closing mechanism, and when the receiver receives at least one signal for locking the opening/closing mechanisms, an engine drive controlling mechanism opens a contact point of the ignition switch to stop the engine.

The keyless engine controlling unit, wherein an informing means informs that the engine is in a stopped state after verifying a stopped state of the engine.

The keyless engine controlling unit wherein an engine drive controlling mechanism is provided in one body with an engine control unit for driving or stopping an engine.

Further areas of applicability of the present invention will become apparent from the detailed description provided hereinafter. It should be understood that the detailed description and specific examples, while indicating the preferred embodiment of the invention, are intended or purposes of illustration only and are not intended to limit the scope of the invention.

BRIEF DESCRIPTION OF THE DRAWINGS

The present invention will become more fully understood from the detailed description and the accompanying drawings, wherein:

FIGS. 7(a) & (b) are flowcharts of a key operation when the engine is maintained in a running state.

DETAILED DESCRIPTION OF THE PREFERRED EMBODIMENTS

The following description of the preferred embodiment(s) is merely exemplary in nature and is in no way intended to limit the invention, its application, or uses.

Figure 1:
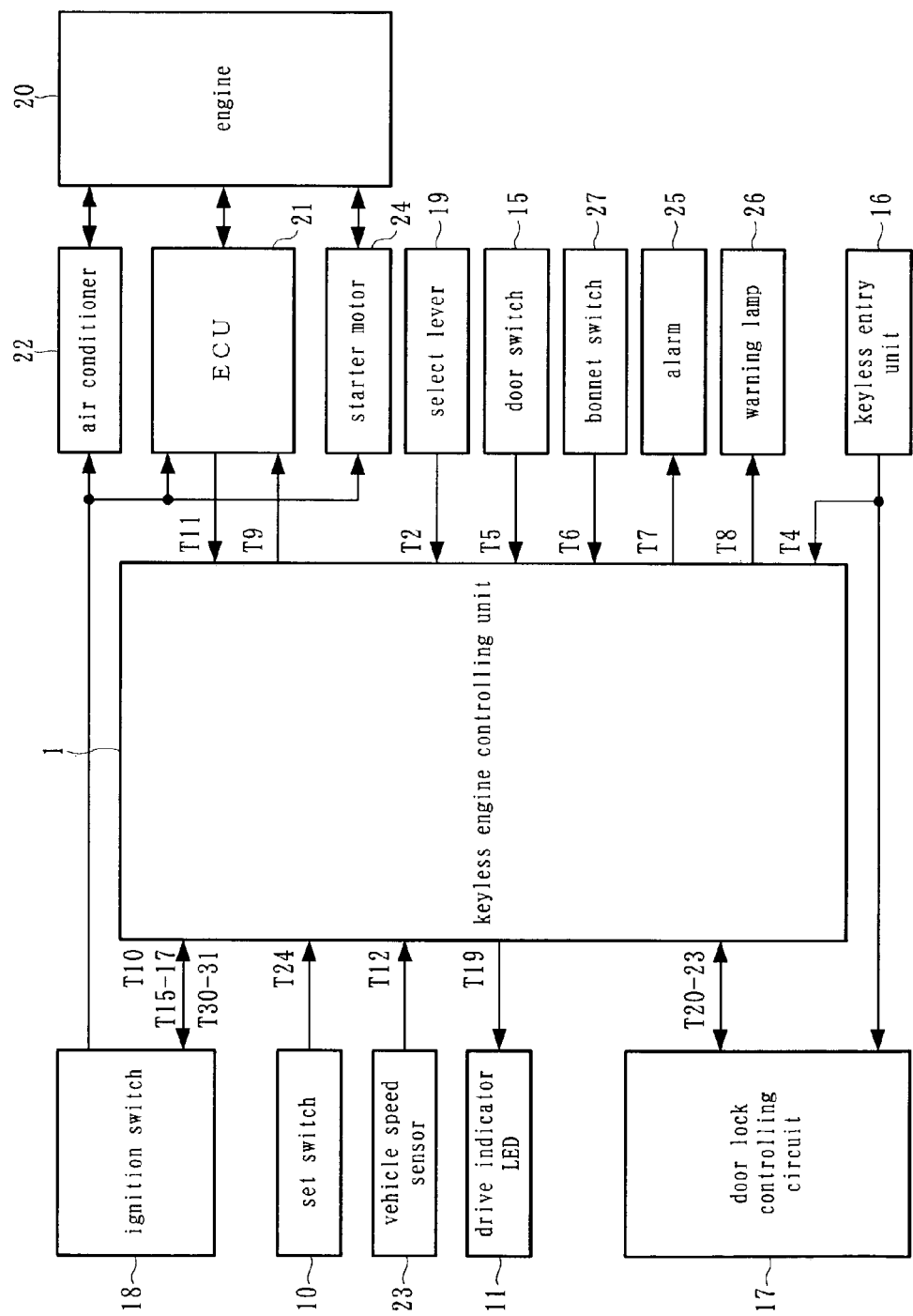
FIG. 1 is a schematic view of a keyless engine controlling unit according to the present invention.
Figure 2:
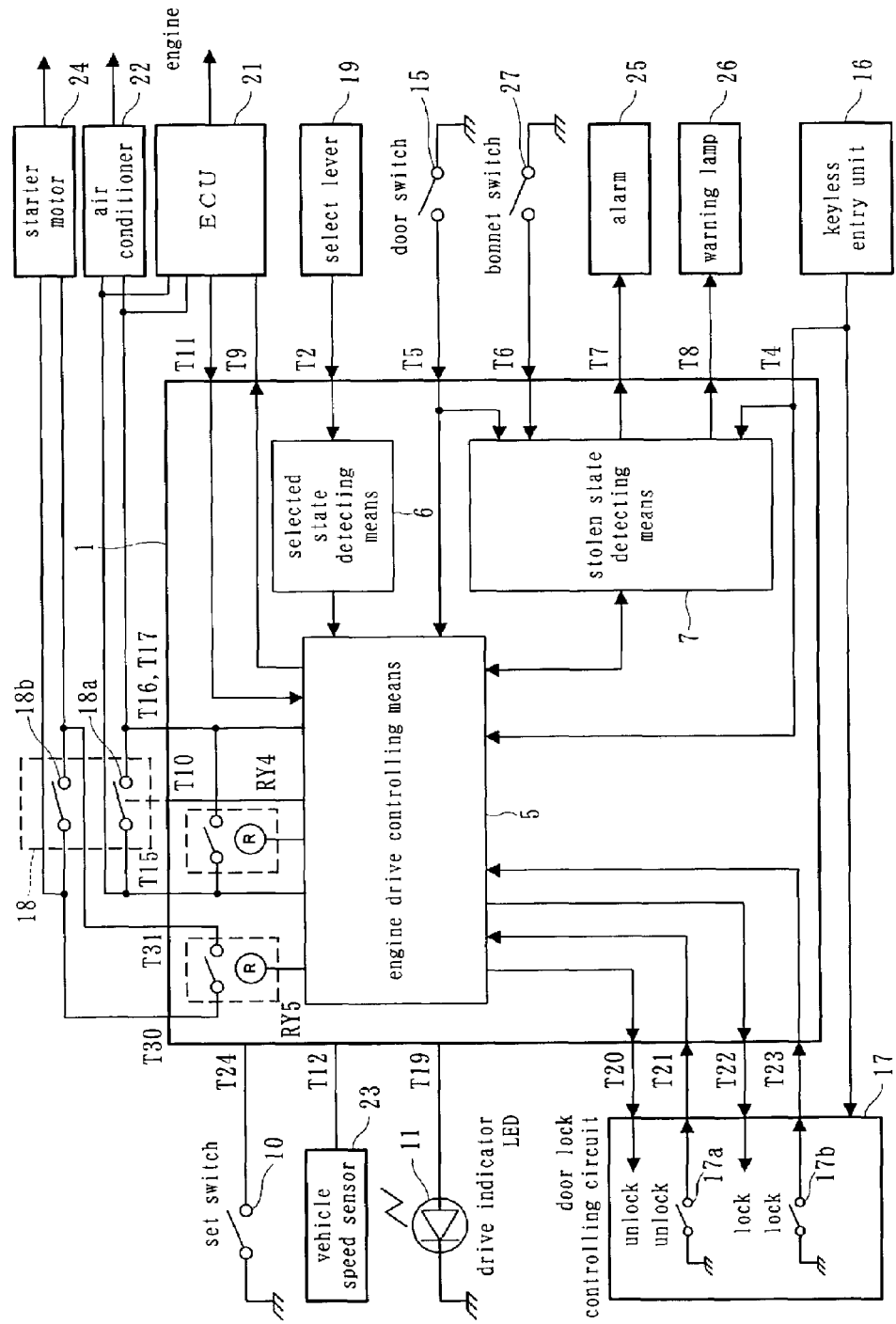
FIG. 2 is a detailed schematic view of the same keyless engine controlling unit as that of FIG. 1.
Figure 3:
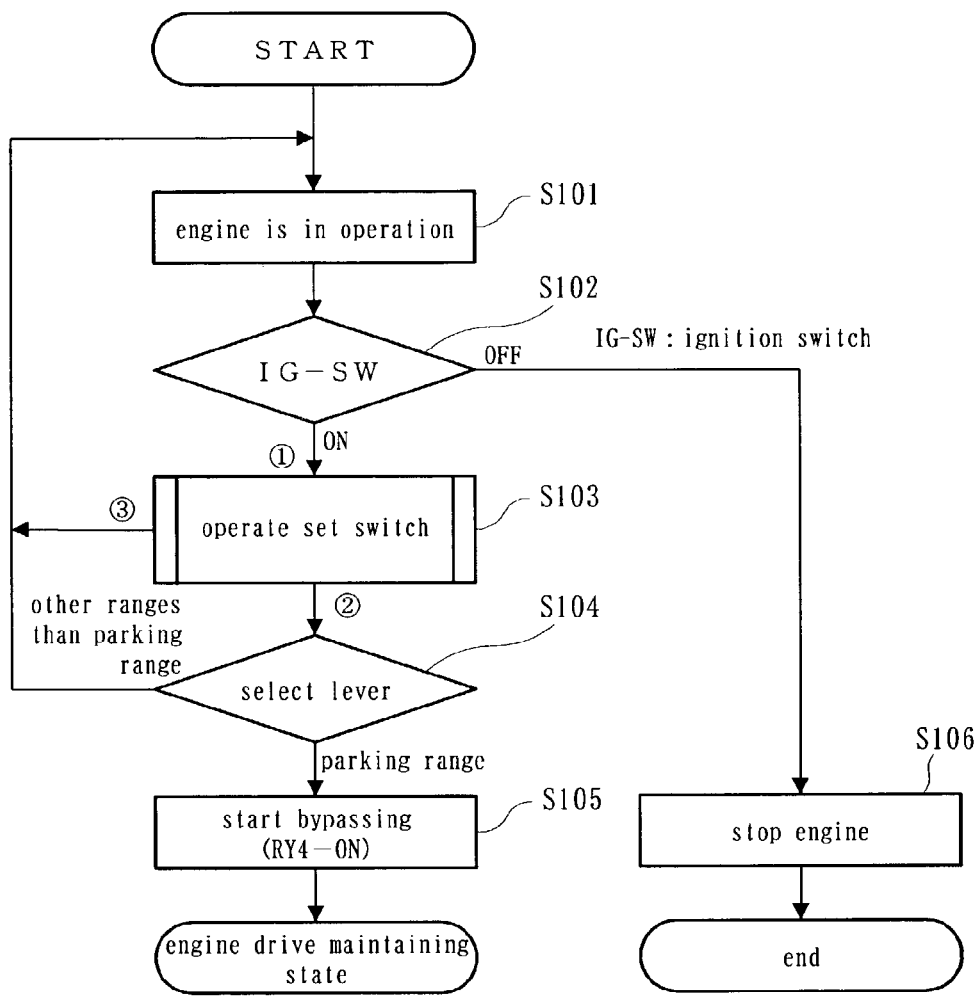
FIG. 3 is a flowchart of a method for maintaining an engine running state.
Figure 4:
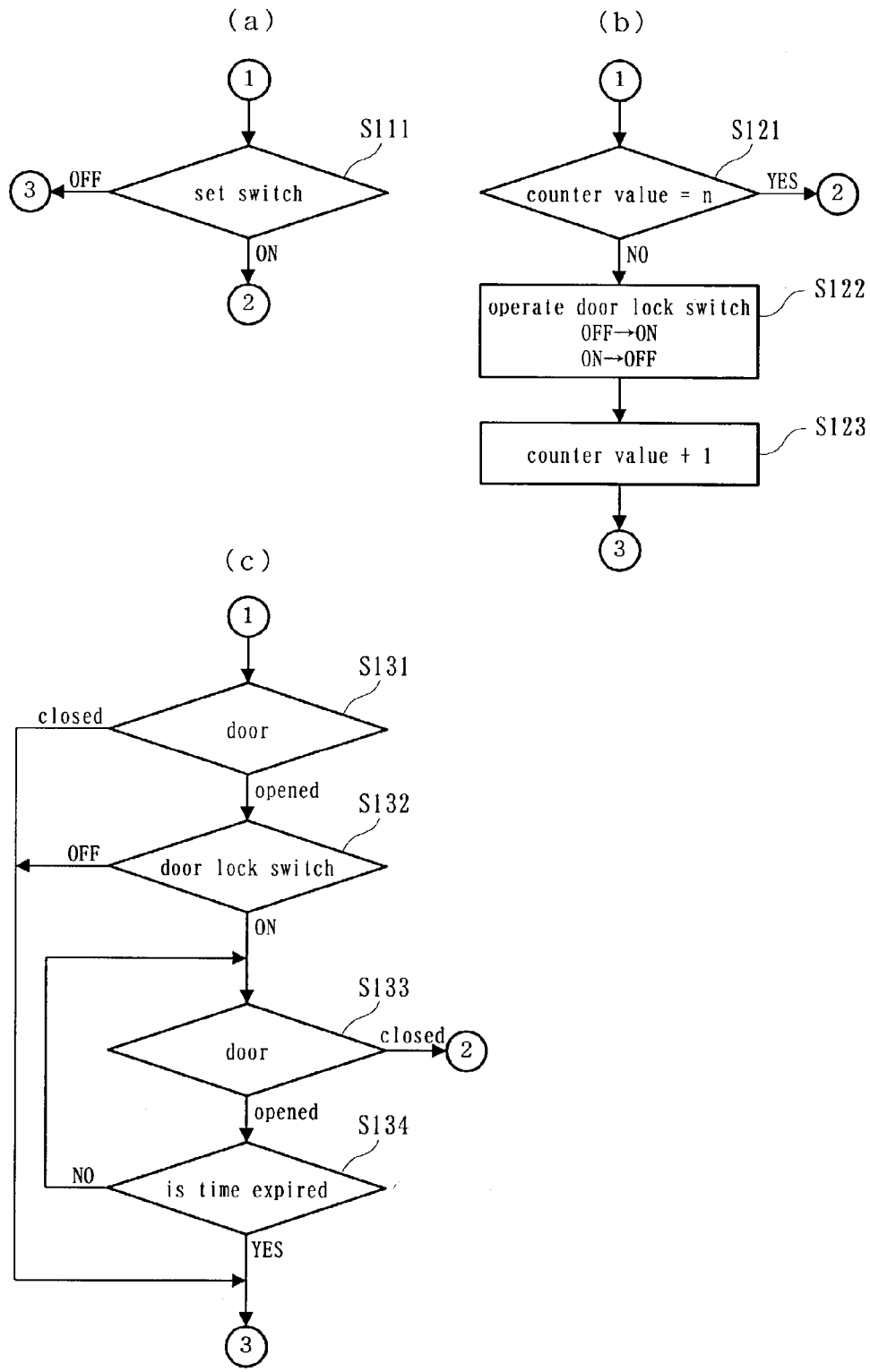
FIGS. 4(a)–(c) are flowcharts of a detailed method for maintaining the engine running state.
Figure 5:
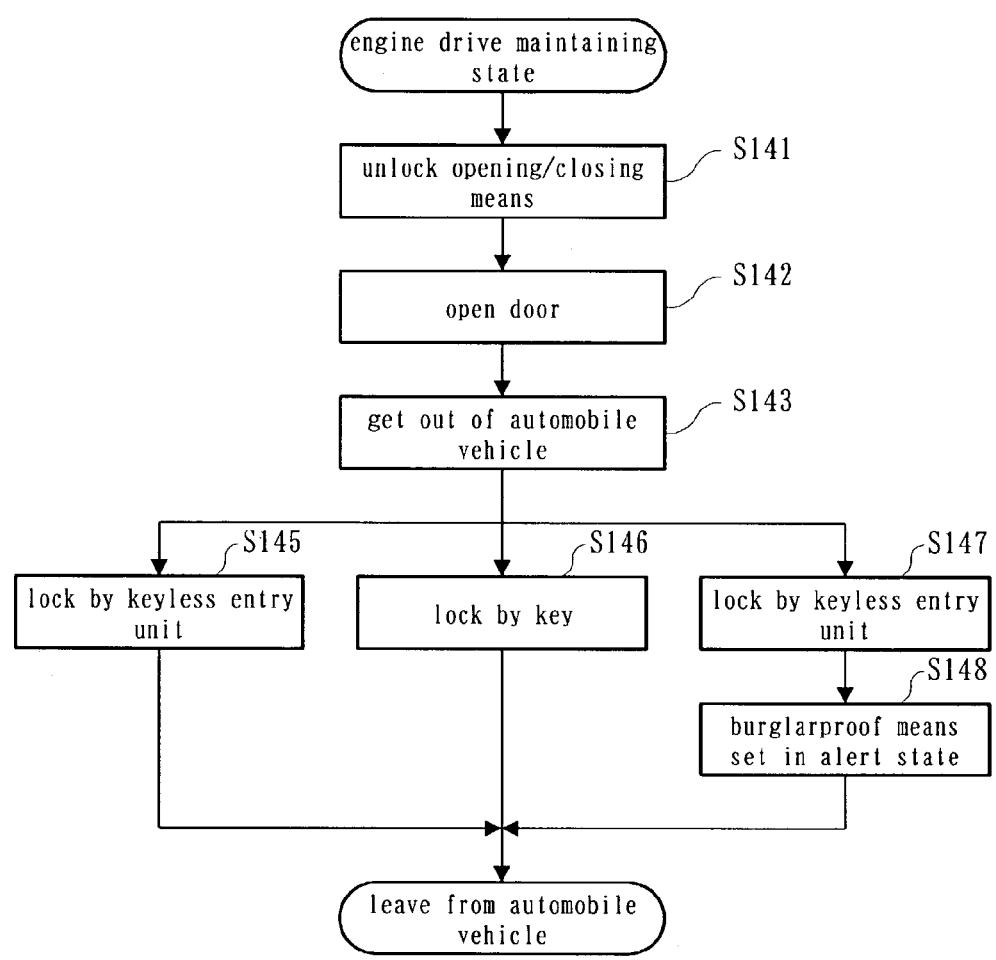
FIG. 5 is a flowchart of an operation when the engine is maintained in a running state.
Figure 6:
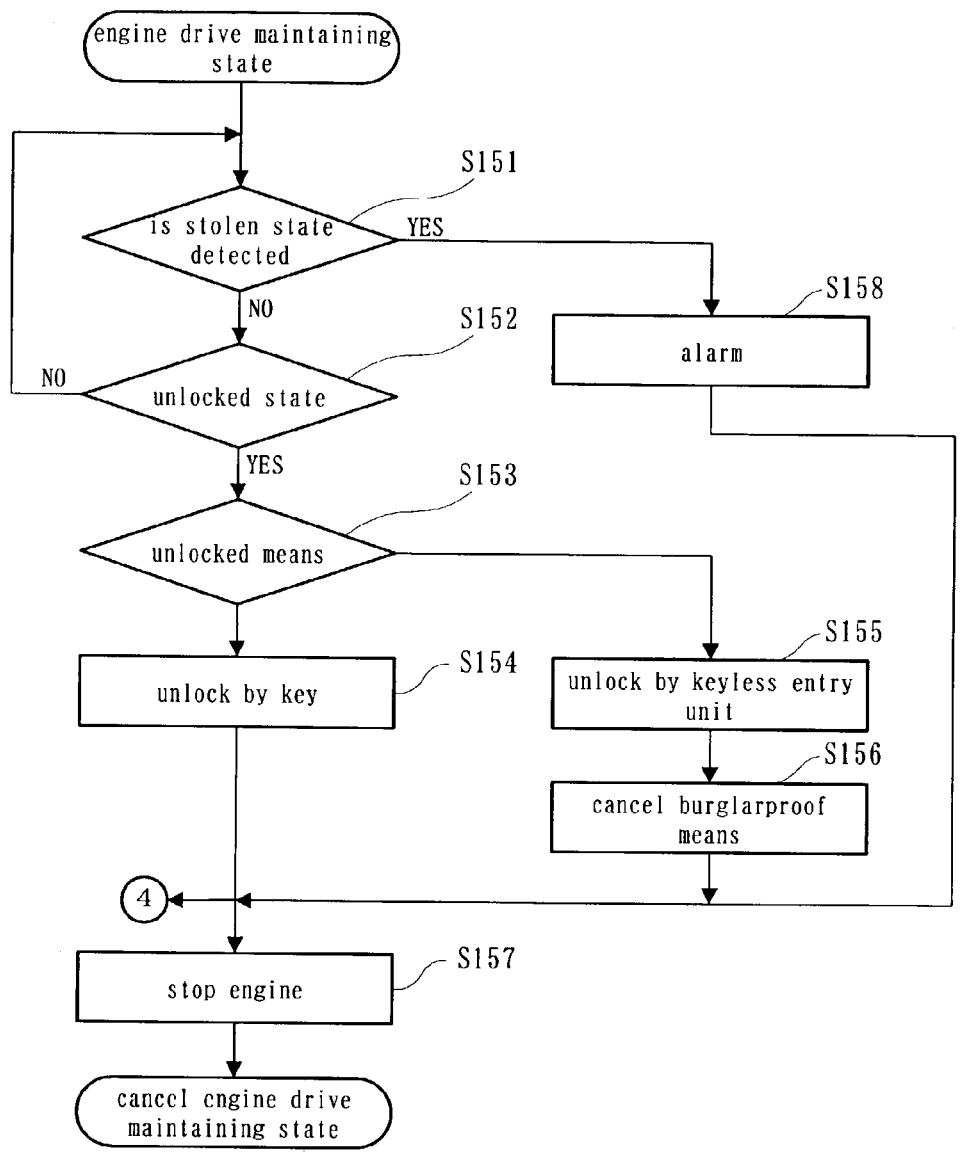
FIG. 6 is a flowchart of an unlocking operation when the engine is maintained in a running state.
Figure 7:
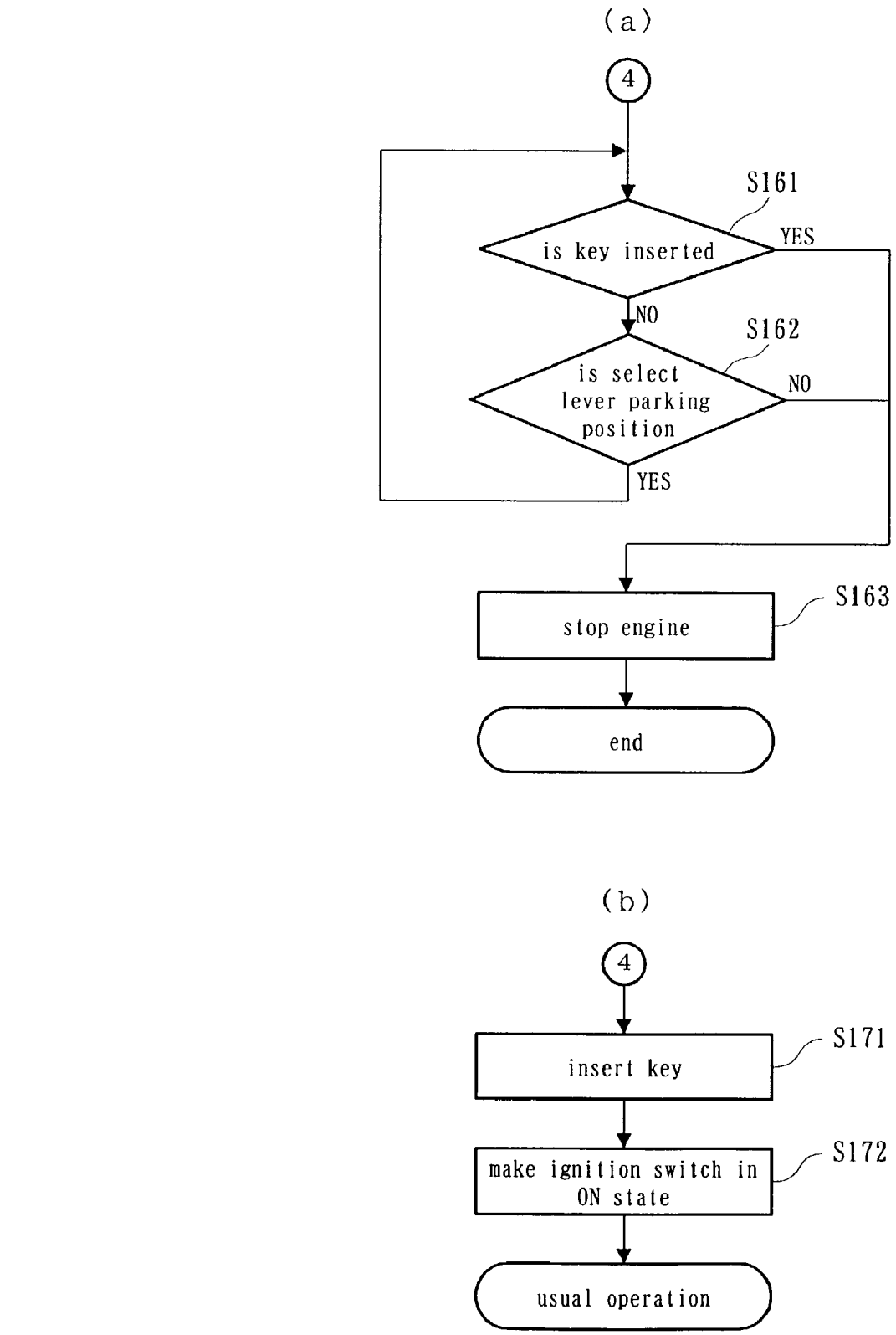
FIG. 7 is a flowchart of a key operation when the engine is maintained in a running state.
Figure 8:
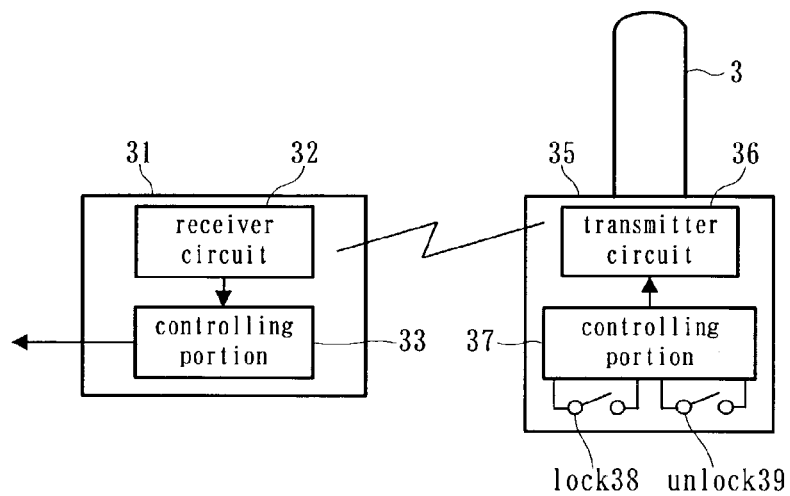
Figure 9:
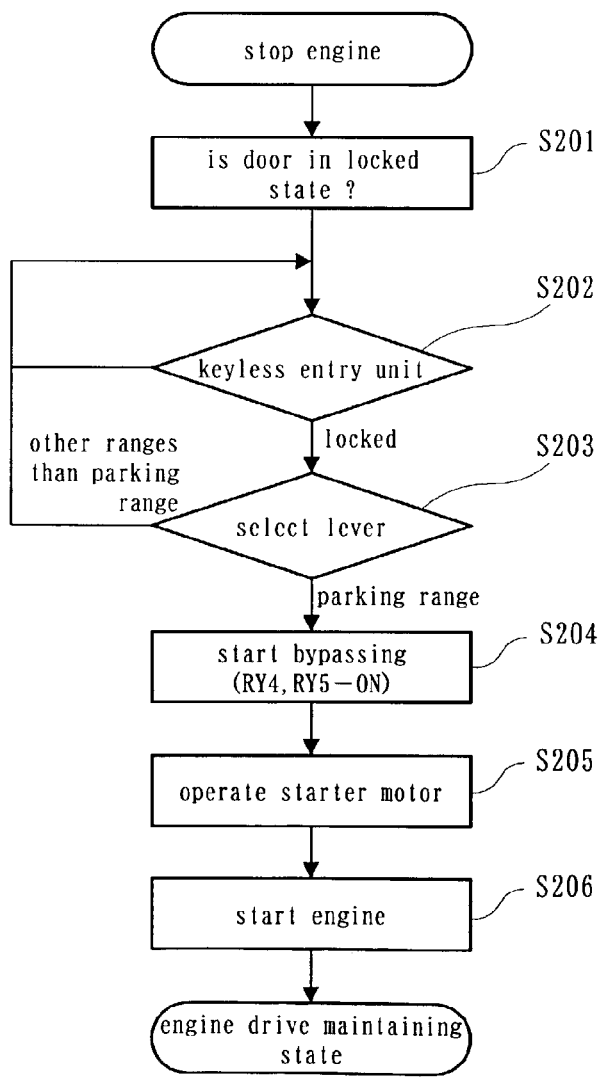
FIG. 9 is a flowchart of an engine starting operation.

As shown in FIGS. 1 to 8, a keyless engine controlling unit 1 can maintain a running state of an engine 20 by bypassing an ignition switch 18 even when a key 3 is extracted from the ignition switch 18. The keyless engine controlling unit 1 includes a microprocessor for controlling various kinds of electronic units and carrying out a programmable sequence (control) via software, thus realizing various functions, which will be stated later. Specifically, an engine drive controlling mechanism 5, a selected state detecting mechanism 6, a stolen state detecting mechanism 7 and the like are realized by software. Note that, the keyless engine controlling unit 1 is not limited to the structure operated by the software. The same functions can also be realized by hardware only. FIG. 8 is a view illustrating a detailed keyless entry unit.

The engine drive controlling mechanism 5 controls the operation of the engine 20 in accordance with various signals inputted to the keyless engine controlling unit 1. The selected state detecting mechanism 6 detects a position of a select lever 19. The stolen state detecting mechanism 7 detects a state of an opening/closing mechanism to determine whether or not the automotive vehicle is stolen.

The keyless engine controlling unit 1 is connected to a variety of conventional electronic units provided in the automotive vehicle. As the state of the electronic units are inputted to the keyless engine controlling unit 1, the electronic units are operated in accordance with instructions (outputs) from the keyless engine controlling unit 1. Next, the varieties of conventional electronic units connected to the keyless engine controlling unit 1 will be explained.

An ignition switch 18 turns on and off the electronic unit circuits by inserting and turning the key 3. The ignition switch 18 has an ON contact point 18a as well as an ACC contact point (not shown) to operate accessories such as an audio unit and a start contact point 18b to operate a starter motor 24. The ON contact point 18a is connected to the keyless engine controlling unit 1 by a relay RY 4, so that the keyless engine controlling unit 1 can detect the state of the ON contact point 18a. In addition, when the relay RY 4 is turned on, the respective electronic units can be operated as if the ON contact point 18a is turned on even if the ON contact point 18a is not turned on. The start contact point 18b is connected to the contact points of a relay RY 5. When the relay RY 5 is turned on, the respective electronic units can be operated as if the start contact point 18b is turned on even if the start contact point 18b is not turned on. Also, the ignition switch 18 includes a circuit to detect a signal (T10) that shows whether the key 3 is inserted. The signal is supplied to the keyless engine controlling unit 1.

An ECU 21 is an engine control unit for running or stopping the engine 20. The control of the engine 20 will be carried out by an ON/OFF operation of the ON contact point 18a of the ignition switch 18. The ECU 21 detects a signal (T11) that shows a running state of the engine 20, and transmits the signal to the keyless engine controlling unit 1.

The starter motor 24 drives the engine 20 when the engine 20 is stopped. The control of the engine 20 will be carried out by an ON/OFF operation of the start contact point 18b of the ignition switch 18.

An air conditioner 22 adjusts a room temperature of the automotive vehicle. The air conditioner 22 is also controlled by an ON/OFF operation of the ON contact point 18a of the ignition switch 18. A vehicle speed sensor 23 measures a running speed of the automotive vehicle and also can detect whether or not the automotive vehicle is actually stopped.

The select lever 19 changes the state of an automatic transmission of the automotive vehicle. The lever 19 carries out a shifting operation from a position where the automotive vehicle is in a stopped state to a drive range to connect the engine 20 to drive wheels to run forward, or the like.

A door lock controlling circuit 17 includes a door lock which controls a lock/unlock of a door opening/closing mechanism or the like. In concrete terms, a lock/unlock operation of the door is performed by operating a lock/unlock solenoid by a door lock switch (unlock) 17a and a door lock switch (lock) 17b. Also, the lock/unlock operation can be performed by signals (T20, T22) from the keyless engine controlling unit 1 or a signal (T4) from keyless entry unit 16 which will be stated later. Signals (T21, T23) of the door switches 17a and 17b are transmitted to the keyless engine controlling unit 1.

A door switch 15 detects whether a door is actually opened or closed (T5). Also, a bonnet switch 27 detects whether a bonnet is actually opened or closed (T6). An alarm 25 informs of theft by sending a sound, a radio wave or the like when the automotive vehicle theft is detected by the stolen state detecting mechanism 7, which will be stated later. Also, a warning lamp 26 informs of the automotive vehicle theft by emitting light when the automotive vehicle is stolen.

The keyless entry unit 16 has a transmitter to transmit a predetermined peculiar signal and a receiver in the automotive vehicle to receive the peculiar signal from the transmitter to lock or unlock the opening/closing mechanism without the key. The receiver 31 shown in FIG. 8 is formed by a receiver circuit 32 to receive the peculiar signal transmitted from the transmitter and a controlling portion 33 to transmit the peculiar signal received by the receiver circuit 32 to the keyless engine controlling unit 1 and the door lock controlling circuit 17. Also, the transmitter is comprised of a controlling portion 37 to generate a code and the like of the peculiar signal to be transmitted to the receiver 31, and a transmitter circuit 36 to transmit the particular signal as a radio signal. The transmitter 35 is provided in one body of the key 3. Also, a lock switch 38 and an unlock switch 39 for indicating that the opening/closing mechanism is locked or unlocked are connected to the controlling portion 37.

A set switch 10 sets the automotive vehicle in an engine running state. Also, when the automotive vehicle is in the engine running state, a drive indicator LED 11 is turned on.

Next, a handling method and operation of the keyless engine controlling unit 1 according to the present embodiment will be explained. Note that, in the following explanation of the present embodiment, reference numerals in parenthesis correspond to the reference numerals shown on flowcharts of FIGS. 3 to 7 and FIG. 9. First, when the key 3 is inserted into the ignition switch 18 of the automotive vehicle and is turned to a start position, the ON contact point 18a and the start contact point 18b are closed to drive the starter motor 24, thus driving or starting the engine 20 (S101). In the running state of the engine 20, the automotive vehicle is operated as usual.

Assuming that, when the automotive vehicle is operated, for example, the vehicle is needed to stop in a parking lot of a store for shopping. In this case, particularly, in the hottest time of year or the coldest time of year, when the automotive vehicle is left in the parking lot for a short time, the temperature inside of the vehicle is required to be reserved by continuing the operation of the air conditioner 22. In such a situation, the automotive vehicle can be left by carrying out the following operation.

First, the engine drive controlling mechanism 5 verifies whether or not the ON contact point 18a of the ignition switch 18 is closed, i.e., the ignition switch 18 is in an ON state (S102). If the ignition switch 18 is turned off as usual (S102) while the engine is in a running state (S101), the engine is usually stopped (S106). If the ignition switch 18 is ON, it is verified whether or not a set operation is performed (S103). The set operation indicates that the engine is set in the engine running state where the engine 20 is maintained in the running state even if the key 3 is extracted from the ignition switch 18. The driver may carry out the set operation (S103). When the set operation (S103) is not carried out, the engine running state (S101) is continued.

One way the set operation (S103) is carried out is by pushing the set switch 10 provided around the ignition switch 18 in a console panel in front of the driver's seat or another position (S111). When detecting that the set switch 10 is pushed, the engine drive controlling mechanism 5 proceeds to further concrete steps for setting the engine in an engine running state. Another way the set operation (S103) is carried out is by use of the door lock switches 17a and 17b on the side of the driver's seat without using the set switch 10. First, the number (n at 121) of the operations of the door lock switches 17a and 17b is predetermined. The number corresponds to the same state as set by the set switch 10 (n is generally a fixed value in a program).

For example, every time the door lock switch 17a is turned on (S122), a counter value is added by 1 (S123). It is determined whether or not the counter value is equal to n (S121). When the counter value is equal to n after the door lock switch 17a is repeatedly turned on, it is assumed that the set operation (S103) is carried out. The operation of the counter value addition can be carried out only by the operation of the door lock switch 17a, only the operation of the door lock switch 17b or the alternate operation of the door lock switch 17a and the door lock switch 17b. Note that, the number (n) of the operations of the door lock switches 17a and 17b can be arbitrarily determined. The set operation (S103) is carried out without the set switch 10, so that the reduction in cost and a set operation (S103) can be easily ensured.

A further way of the set operation (S103) is related to an opening/closing of the door on the side of the driver's seat. This way is carried out by opening the door on the driver's seat once (S131), turning on the door lock switches 17a and 17b (S132) and finally closing the door (S133) within a predetermined time (S134).

After the set operation (S103) is carried out, the engine drive controlling mechanism 5 verifies the state of the select lever 19 (S104). The verification is carried out according to the information sent from the selected state detecting mechanism 6 for detecting the position of the select lever 19. Only when the select lever 19 is in park at the step where the set operation (S103) is carried out, can an engine running state be realized. When the select lever 19 is not in park, even if the set operation (S103) is carried out, the engine running state cannot be realized. Therefore, a careless start of the automotive vehicle can be avoided. Note that, in case of a manual transmission vehicle, only when a shift lever of the manual transmission is in a neutral state, can the engine running state be realized. Furthermore, the system may be designed so that the engine running state can be realized after it is verified by the vehicle speed sensor 23 whether the automotive vehicle is stopped.

After the select lever 19 in the parking position is verified (S104), the relay RY 4 is turned on, so that the ON contact point 18a of the ignition switch 18 is bypassed (S105). Accordingly, even if the key 3 is rotated and extracted from the ignition switch 18, the state where the ON contact point 18a is closed is maintained, thus realizing an engine running state. In order to indicate the engine running state of the vehicle to the driver, the drive indicator LED 11 can be mounted in proximity to the ignition switch 18.

The driver extracts the key 3 from the ignition switch 18 and opens the door (S142) to get out of the vehicle (S143). The driver locks the opening/closing mechanism (S145, S146), such as the door, by using the key 3 or the keyless entry unit 16. After that, the driver leaves the automotive vehicle in the engine running state. As stated above, since the driver can leave his/her automotive vehicle by locking the opening/closing mechanism such as the door by using the key 3, the key is not left in the automotive vehicle. This prevents the vehicle from being stolen and also easily supervises the key without a special spare key.

Note that, when the automotive vehicle is in the engine running state, the engine drive controlling mechanism 5 may unlock a door key (S141) by sending a signal to the door lock controlling circuit 17. A burden to unlock the door key is saved, so that the driver can open the door with ease and get out of the vehicle.

Also, in an automotive vehicle provided with a burglarproof mechanism, the opening/closing mechanism is locked by using the key 3. The burglarproof mechanism may be set in an alert state, thus easily preventing the vehicle from being stolen even if the engine is running. In addition, the opening/closing mechanism may be locked by using the transmitter 35 of the keyless entry unit 16 and also the burglarproof mechanism may be set in an alert state (S148).

Next, the handling and operation of the present embodiment after the driver has come back to the automotive vehicle in the engine running state will be explained. The driver unlocks the door and gets in the automotive vehicle by using the key 3 or the keyless entry unit 16. After that, the key is inserted into the ignition switch 18 (S171) and rotated to set the ignition switch 18 in an ON state (S172). The engine drive controlling mechanism 5 detects this operation of the ignition switch 18 by the key 3 and cancels the engine running state (the relay (RY 4) is turned off to cancel a bypassing operation) to return the automotive vehicle to a usual driving state of the engine. Thus, the driver can start driving the vehicle.

The case of a usual start of the automotive vehicle without stopping the engine 20 in an engine running state is explained. However, in order to avoid a careless start of the automotive vehicle, the engine 20 may be stopped and restarted by the following method.

First, in an automotive vehicle having a burglarproof mechanism, when the door switch 15 indicates an open state in spite of the vehicle being in a locked state or the bonnet switch 27 indicates an open state bonnet, the stolen state detecting mechanism 7 detects that the vehicle is stolen in accordance with this switch information (S151). Then, the alarm 25 and the warning lamp 26 are operated (S158) and also the engine 20 is stopped by the stolen state detecting mechanism in cooperation with the engine drive controlling mechanism 5 (S157). The engine drive controlling mechanism 5 turns off the relay RY 4 and cancels the bypassing operation of the ON contact point 18a of the ignition switch 18, so that the engine 20 is stopped. In this case, the engine drive controlling mechanism 5 can transmit a signal T9 to prohibit the ECU 21 from controlling the engine. Thus, the engine is not started even if the starter motor 24 is forcibly rotated. When the engine 20 is stopped, even if the vehicle is in the engine running state, it is possible to more certainly prevent the automotive vehicle from being stolen.

Despite the presence or absence of the burglarproof mechanism, when the opening/closing mechanism is unlocked by the key 3 or the keyless entry unit 16, the engine 20 may be stopped. In concrete terms, when the engine drive controlling mechanism 5 detects an unlocked state (S152), an unlocked state is determined (S153) and other processes are carried out. Then, the engine 20 is stopped (S157). For example, when the unlock operation is carried out by the key 3 (S154), the engine 20 is immediately stopped. When the unlock operation is carried out by the keyless entry unit 16 (S155), an alert state of the burglarproof mechanism is cancelled (S156). Note that, in the case where the driver leaves the automotive vehicle and a fellow passenger remains in the vehicle, when the fellow passenger operates the door lock switch 17a to operate the door lock controlling circuit 17 within the vehicle, the engine 20 may be stopped as well.

Also, after the driver gets in the vehicle, when the insertion of the key 3 into the ignition switch 18 is detected (S161), the engine 20 may be stopped. Also, even when the select lever 19 is erroneously operated, in order to avoid a careless start of the automotive vehicle, when the select lever 19 is shifted to a position other than the park position (S162), the engine 20 may be stopped. Also, a similar effect can be obtained by causing the select lever 19 in a fixed state when the key 3 is inserted into the ignition switch 18 in a state other than ON.

Next, another function of the keyless engine controlling unit 1 will be explained. This function is to start the engine 20 from outside of the automotive vehicle where the engine is in a stopped state. This is effective for warming up the engine in advance in winter under the condition that the opening/closing mechanism is locked. In concrete terms, under the condition that the engine is in a stopped state and also the opening/closing mechanism is locked (S201), the lock switch 38 of the transmitter 35 of the keyless entry unit 16 is closed by a pushing operation in the proximity of the automotive vehicle (S202). When receiving the signal of the operation of the lock switch 38 via the receiver 31, the engine drive controlling mechanism 5 recognizes the position of the select lever 19 (S203). When it is recognized, in accordance with the information from the selected state detecting mechanism 6, that the select lever 19 is in park, the engine drive controlling mechanism 5 closes the relay RY 4 to bypass the ON contact point 18a of the ignition switch 18 (S204). Consecutively, the relay RY 5 is closed to bypass the start contact point 18b (S204).

As the start contact point 18b is bypassed, the starter motor 24 is operated (S205), starting the engine 20 (S206). Accordingly, the engine 20 is started without inserting the key 3 into the ignition switch 18. The key is not left in the automotive vehicle. This prevents the vehicle from being stolen and also easily supervises the key without a special spare key. Moreover, since the select lever 19 in the park position is recognized, the careless start of the automotive vehicle can be avoided. Note that, this starting operation of the engine is carried out when the engine drive controlling mechanism 5 detects that the engine 20 is in the stopped state in accordance with the signal T11 of the ECU 21.

Note that, in order to make it possible to recognize whether or not the engine 20 is actually started even from a place apart from the automotive vehicle, headlights, vehicle parking lights or turn signal lights may be lightened as an informing mechanism. In this case, an informing operation is carried out when the engine drive controlling mechanism 5 detects that the engine 20 is in a running state in accordance with the signal T11 of the ECU 21. Note that, since a momentary lighting may be missed, the vehicle lights may be left on. Also, sound information such as a horn tooting other than the light information can be used, whatever the operator can recognize. Therefore, it is possible to recognize that the engine 20 is in a running state from outside of the vehicle, and also even when the engine 20 cannot be started, the trouble can be recognized.

Note that, when the transmitter 35 of the keyless entry unit 16 has no more than one switch, after the switch is once operated to unlock, the switch may be again operated within a predetermined time (within 30 seconds, for example) so that the engine 20 is started.

In order to stop the engine 20 in a running state from outside of the vehicle, the lock switch 38 of the transmitter 35 is operated. The engine drive controlling mechanism 5 receives the lock signal, via the receiver 31, to open the relay 4, so that the bypassing operation of the ON contact point 18a is cancelled to stop the engine 20. Thus, the engine 20 is easily stopped by a simple operation such as an operation of pushing the lock switch 38. Note that, in order to make it possible to recognize whether or not the engine 20 is actually stopped even from a place apart from the automotive vehicle, headlights, vehicle lights or direction indicator lights may be lightened as an informing mechanism. In this case, an informing operation is carried out when the engine drive controlling mechanism 5 detects that the engine 20 is in a stopped state in accordance with the signal T11 of the ECU 21. Also, for the informing means, sound information such as a horn tooting other than the light information can be used, whatever the operator can recognize. It is possible to avoid forgetting to stop the engine 20 by the informing operation.

Note that, when the transmitter 35 of the keyless entry unit 16 has no more than one switch, after the switch is once operated to unlock, the switch may be again operated within a predetermined time (within 30 seconds, for example) so that the engine 20 is stopped.

The keyless engine controlling unit 1 and the ECU 21 are separately constructed on respective electrical boards in this embodiment. However, since any of the units can be realized by using a microcomputer, it is possible to provide both of the units in one body, so that the number of parts can be reduced and the cost can be reduced.

According to the present invention, since an engine drive controlling mechanism maintains a running state of an engine even when the key is extracted from the ignition switch with a set switch set, it is possible to lock an opening/closing mechanism by using the key and leave the automotive vehicle maintaining an air conditioner or the like in operation without stopping the engine. Because to this, the key is not left in the automotive vehicle, thus this prevents the vehicle from being stolen and also easily supervises the key without a special spare key.

Also, when a select lever of an automatic transmission is positioned in park, since the running state of the engine is maintained even when the key is extracted from the ignition switch, a careless start of the automotive vehicle can be avoided.

According to the present invention, in addition because of a predetermined number of operations of a door lock switch of a door on the side of a driver's seat, since the running state of the engine is maintained even when the key is extracted from the ignition switch, there is no need to newly provide another key, and also a set operation is easy.

According to the present invention, when the door lock switch is turned on under the condition that the door on the side of the driver's seat is opened and then the door is closed, since the running state of the engine is maintained even when the key is extracted from the ignition switch, there is no need to newly provide another key, and also a set operation is easy.

According to the present invention, since the opening/closing mechanism is unlocked as the engine drive controlling mechanism is shifted to a state for maintaining the drive state of the engine, a burden to unlock the door key is saved, so that the driver can open the opening/closing mechanism with ease and get out of the vehicle.

According to the present invention, since a door lock mechanism is operated by using the key to lock the opening/closing mechanism and also a burglarproof mechanism can be set in an alert state, even if the engine is in the running state, the automotive vehicle can be prevented from being stolen by an easy operation.

According to the present invention, since the opening/closing mechanism is locked by using a keyless entry unit and also the burglarproof mechanism can be set in an alert state, the automotive vehicle can be prevented from being stolen by an easy operation.

According to the present invention, when the key is inserted into the ignition switch, the engine drive controlling mechanism stops the engine, so that a careless start of the automotive vehicle can be avoided.

According to the present invention, when the opening/closing mechanism is unlocked by operating the door lock mechanism, the engine drive controlling mechanism stops the engine, so that even when the select lever is erroneously operated after the driver comes back to the automotive vehicle and opens the opening/closing mechanism to get in the vehicle, a careless start of the automotive vehicle can be avoided.

According to the present invention, when the opening/closing mechanism is unlocked by the keyless entry unit, the engine drive controlling mechanism stops the engine, so that even when the select lever is erroneously operated after the driver comes back to the automotive vehicle and opens the opening/closing mechanism to get in the vehicle, a careless start of the automotive vehicle can be avoided.

According to the present invention, when the opening/closing mechanism is unlocked by the keyless entry unit, the alert state of the burglarproof mechanism is cancelled. Because of this, it is impossible to get in the automotive vehicle without having a proper transmitter of the keyless entry unit. This prevents the automotive vehicle in the running state engine from being stolen.

According to the present invention, when the stolen state detecting mechanism detects an automotive vehicle theft, the engine is stopped, so that the automotive vehicle theft can further be avoided.

According to the present invention, since the engine is stopped when a selected state detecting mechanism detects that the select lever is shifted to a position other than park, even when the select lever is erroneously shifted, a careless start of the automotive vehicle can be avoided.

According to the present invention, only when the key is inserted and the ignition switch is turned on, is it possible for the select lever to be operated, so that even when the select lever is erroneously operated, a careless start of the automotive vehicle can be avoided.

According to the present invention, it is possible for the driver to leave the automotive vehicle while the engine is started by the transmitter of the keyless entry unit and the opening/closing mechanism is locked. Because of this, the key is not left in the automotive vehicle. This prevent the vehicle from being stolen and also easily supervises the key without a special spare key.

Moreover, since the select lever in park has been verified, a careless start of the automotive vehicle can be avoided.

According to the present invention, it is possible for the driver to leave the automotive vehicle while the engine is started by the transmitter of the keyless entry unit and the opening/closing mechanism is locked. Because of this, the key is not left in the automotive vehicle. This prevents the vehicle from being stolen and also easily supervises the key without a special spare key.

Moreover, since the select lever in park has been verified, a careless start of the automotive vehicle can be avoided.

According to the present invention, since an informing mechanism for informing of the running state of the engine is provided, after verifying the running state engine, it is possible to recognize the state of the engine from outside of the vehicle, and also even when the engine is not started, the trouble can be recognized.

According to the present invention, the engine can be easily stopped without unlocking the opening/closing mechanism.

According to the present invention, since the informing mechanism informs of the stopped state engine after verifying the stopped state engine, the engine is prevented from being forgotten to stop.

According to the present invention, since the engine drive controlling mechanism is provided in one body with an engine control unit for controlling the running state and the stopped state of the engine, a reduction in cost and the number of parts can be realized.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A keyless engine controlling unit for controlling an engine of an automotive vehicle, comprising:
   an ignition switch for generating starting and stopping instructions of said engine by inserting and operating a key thereinto;
   a door lock for locking an opening/closing mechanism such as a door; and
   an automatic transmission;
   said controlling unit further comprises:
   a locked state detecting mechanism for detecting a state of a door lock switch for operating said door lock;
   a selected state detecting mechanism for detecting a select lever state of said automatic transmission; and
   an engine drive controlling mechanism for bypassing a contact point of said ignition switch,
   wherein, when said engine is in a running state, said selected state detecting mechanism detects that said select lever is positioned in park, said door lock switch of a door on a driver's seat side is turned on and off by a predetermined number of operations, said contact point of said ignition switch is bypassed, thus maintaining said running state of said engine even when said key is extracted from said ignition switch.

2. A keyless engine controlling unit for controlling an engine of an automotive vehicle, comprising:
   an ignition switch for generating starting and stopping instructions of said engine by inserting and operating a key thereinto;
   a door lock for locking an opening/closing mechanism such as a door; and
   an automatic transmission;
   said controlling unit further comprises:
   a locked state detecting mechanism for detecting a state of a door lock switch for operating said door lock;
   a selected state detecting mechanism for detecting a select lever state of said automatic transmission; and
   an engine drive controlling mechanism for bypassing a contact point of said ignition switch,
   wherein, when said engine is in a running state, said selected state detecting mechanism detects that said select lever is positioned in park, and said door lock switch is turned on while a door on a driver's seat side is opened and said door is then closed, said contact point of said ignition switch is bypassed, thus maintaining said running state of said engine even when said key is extracted from said ignition switch.

3. The keyless engine controlling unit as set forth in claim 1, wherein when said engine drive controlling mechanism is shifted to a state for maintaining a running state of said engine, said opening/closing mechanism is unlocked.

4. The keyless engine controlling unit as set forth in claim 1, further comprising a stolen state detecting mechanism for detecting said automotive vehicle in a stolen state by detecting an opened/closed state of said opening/closing mechanism, and a burglarproof mechanism having an alarm for notifying when said stolen state detecting mechanism detects that said automotive vehicle is in a stolen state, wherein, under said running state of said engine where said key has been extracted from said ignition switch, said door lock is operated by using said key, so that said opening/closing mechanism is locked and said burglarproof mechanism is set in an alert state.

5. The keyless engine controlling unit as set forth in claim 1, further comprising:
- a keyless entry unit having a transmitter for transmitting a predetermined peculiar signal and a receiver provided in said automotive vehicle for receiving said peculiar signal from said transmitter for locking and unlocking said opening/closing mechanism without said key; and
- a burglarproof mechanism having a stolen state detecting mechanism for detecting said automotive vehicle in a stolen state by detecting an opened/closed state of said opening/closing mechanism, and an alarm for notifying when said stolen state detecting mechanism detects that said automotive vehicle is in a stolen state;
- wherein, under said running state of said engine where said key has been extracted from said ignition switch, said keyless entry unit is used, so that said opening/closing mechanism is locked and said burglarproof mechanism is set in an alert state.

6. The keyless engine controlling unit as set forth in claim 1, wherein when said engine is in said running state and said key has been extracted from said ignition switch, and when said key is inserted into said ignition switch, said engine drive controlling mechanism opens said contact point of said ignition switch to stop said engine.

7. The keyless engine controlling unit as set forth in claim 1, wherein when said engine is in said running state and said key has been extracted from said ignition switch, and when said opening/closing mechanism is unlocked by operating said door lock, said engine drive controlling mechanism opens said contact point of said ignition switch to stop said engine.

8. The keyless engine controlling unit as set forth in claim 1, wherein when said engine is in said running state and said key has been extracted from said ignition switch, and when said opening/closing mechanism is unlocked by using said keyless entry unit, said engine drive controlling mechanism opens said contact point of said ignition switch to stop said engine.

9. The keyless engine controlling unit as set forth in claim 5, wherein when said engine is in said running state and said key has been extracted from said ignition switch, and when said opening/closing mechanism is unlocked by using said keyless entry unit, said alert state of said burglarproof mechanism is cancelled.

10. The keyless engine controlling unit as set forth in claim 4, wherein when said engine is in said running state and said key has been extracted from said ignition switch, and when said stolen state detecting mechanism detects that said automotive vehicle is in a stolen state, said engine drive controlling mechanism opens said contact point of said ignition switch to stop said engine.

11. The keyless engine controlling unit as set forth in claim 1, wherein when said engine is in said running state and said key has been extracted from said ignition switch, and when said selected state detecting mechanism detects that said select lever is shifted to a position other than park, said engine drive controlling mechanism opens said contact point of said ignition switch to stop said engine.

12. The keyless engine controlling unit as set forth in claim 1, wherein when said engine is in said running state and even when said key is extracted from said ignition switch, only when said key is inserted into said ignition switch and turned on, said select lever can be operated.

* * * * *